United States Patent
Randolph

[15] 3,649,834
[45] Mar. 14, 1972

[54] LAMINAR GAS FLOW RADIATION DETECTOR
[72] Inventor: Henry W. Randolph, Belvedere, S.C.
[73] Assignee: The United States of America as represented by the United States Atomic Energy Commission
[22] Filed: Oct. 6, 1970
[21] Appl. No.: 78,538

[52] U.S. Cl.............250/83.6 FT, 73/23.1, 250/43.5 MR, 313/93
[51] Int. Cl..............G01t 1/18, G01n 23/12, H01j 39/26
[58] Field of Search............250/43.5 MR, 83.6 FT; 313/93; 73/23.1

[56] References Cited

UNITED STATES PATENTS 3,238,367  3/1966  Sternberg et al.................250/43.5
2,968,730  1/1961  Morris et al...................250/83.6 FT
3,046,396  7/1962  Lovelock.......................250/83.6 FT
3,471,261  10/1969  Patterson......................73/23.1 X Primary Examiner—Archie R. Borchelt
Attorney—Roland A. Anderson

[57] ABSTRACT

A radiation detector for high resolution measurement of energy spectra in flowing gas samples has a first electrode, a parallel second electrode of opposite polarity, and a detection chamber between the two electrodes. An integral pulse or stream of sample gas is passed in laminar flow through the detection chamber. A nonradioactive gas flows around the stream of sample gas to prevent contact and contamination of either electrode with radioactive material, as well as to absorb the radiation from the sample gas for detection.

6 Claims, 1 Drawing Figure

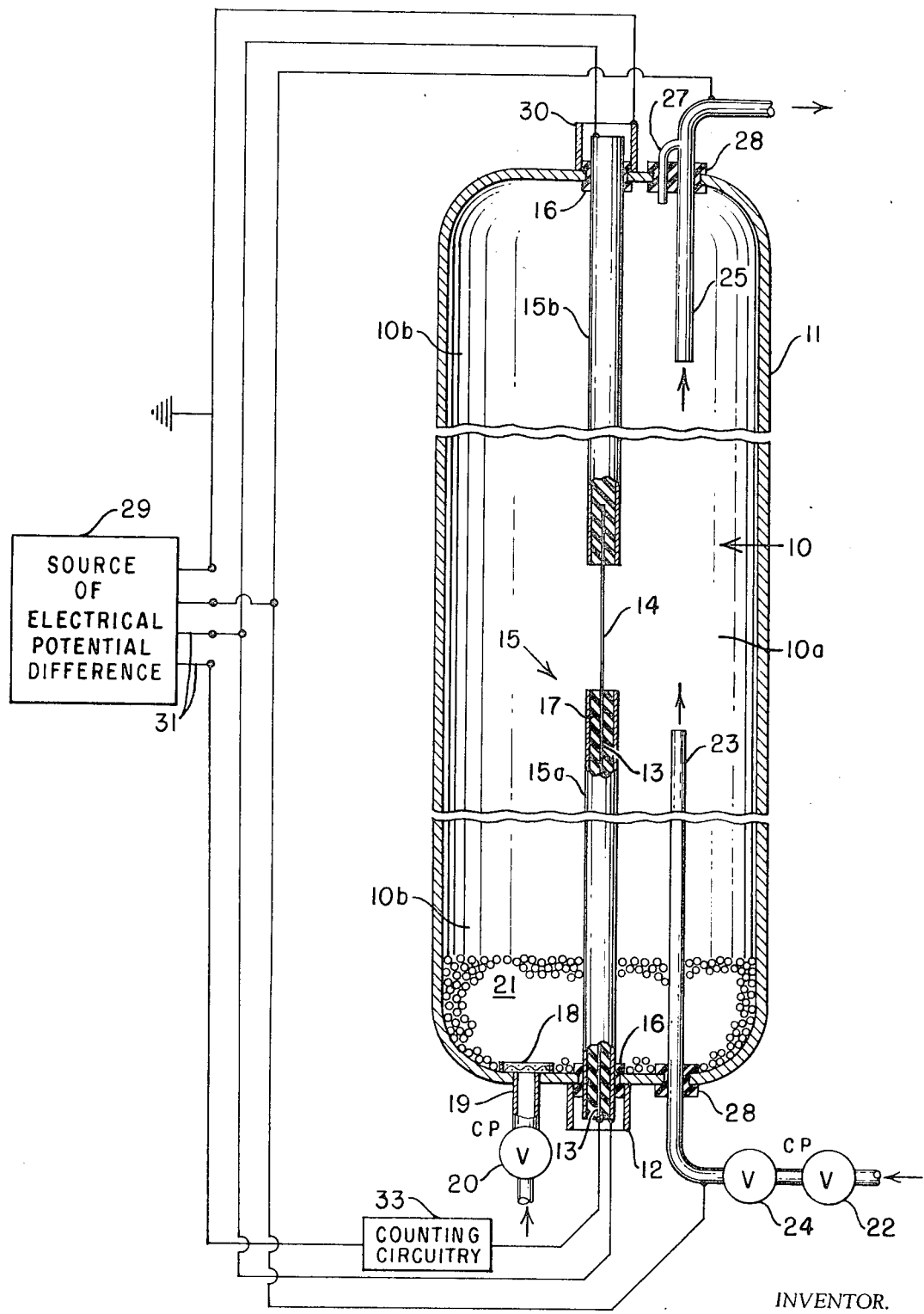
INVENTOR.
HENRY W. RANDOLPH

LAMINAR GAS FLOW RADIATION DETECTOR

BACKGROUND OF THE INVENTION

The invention described herein was made in the course of or under a contract with the U.S. Atomic Energy Commission.

1. Field of Invention

This invention relates to radiation detection devices for monitoring flowing gas samples or samples of vaporizable material. Gas-filled devices such as ionization chambers and proportional counters that contain ionizable or counting gases may include the improvement of the present invention. These devices can be used to detect alpha, beta, or low energy gamma radiation through the ionization of the contained gas and analysis of the resulting electrical output. The invention particularly relates to proportional counters for determining beta decay energy spectra.

The copending U.S. Pat. application Ser. No. 78,427, filed Oct. 6, 1970 describes a laminar flow cell for general sampling and monitoring techniques similar in principal to the present development.

2. Description of Prior Art

Gas-filled radiation detector devices often employ a detection chamber containing a counting gas with the sample or radiation source maintained outside the chamber. Errors in measurement are introduced from attenuation by the chamber walls and from the effects of photoelectrons emitted from the wall materials. Detection devices designed to contain a liquid or solid sample, either in a sample container or on a substrate, inside the detection chamber can incur similar errors from back scattered radiation or photoelectrons.

Other radiation detectors are designed to pass a sample gas through a detection chamber but in these devices the sample is permitted to contact the electrodes or a member adjacent to the electrodes. In fact, some designs require the precipitation of radioactive particles on the electrodes or a proximate member. In these detectors residual radioactive material can introduce errors if the detection chamber and associated members are not thoroughly cleaned between operations. In some continuous processes, where good accuracy is required, sufficiently frequent and adequate cleanings may not be practicable.

In measuring radiation energy levels for preparing an alpha or beta decay spectrum, the above errors can result in extraneous events and poor resolution of energy levels. If decay particles collide with wall or other surfaces prior to disipating all their energy in the counting gas, the energy level measurements will be misleading. Low energy beta particles may not produce sufficient ionization to be detected without amplification within the chamber, but such amplification will increase the contributions of these errors and further vitiate the spectrum measurements.

SUMMARY OF THE INVENTION

Therefore it is an object of the present invention to provide a gas-filled radiation detector with improved accuracy and energy level resolution.

It is also an object to provide a gas-filled radiation detector in which errors resulting from detection chamber wall effects are minimized.

It is a further object to provide a gas-filled radiation detector having sample gas passing through the inner volume of the detection chamber with minimum error resulting from residual radioactive material.

In accordance with the present invention, there is provided a radiation detector for monitoring a flowing or pulsating gas stream having a first electrode member, a second electrode member parallel to the first electrode member and an enclosed detection chamber between the two electrode members. A source of electrical potential is connected between the electrode members to establish uniform electrical field within the detection chamber. Means are provided for passing a nonradioactive counting gas in laminar flow between the electrode members. A sample injection tube is positioned within the detection chamber in spaced relationship to both the first and second electrodes for introducing a sample gas in laminar flow into the counting gas flow. The sample gas is entrained as an integral flow stream or as discrete quantities of sample gas within the flow of counting gas. A receiving tube is coaxially aligned opposite the sample tube for removing the sample gas from the detection chamber.

DESCRIPTION OF THE DRAWING

The present invention is illustrated in the accompanying FIGURE which is a schematic view, partially in cross section, of a laminar gas flow radiation detector.

DETAILED DESCRIPTION OF THE PREFERRED EMBODIMENT

Referring now to the FIGURE, a first or peripheral electrode 11 is shown as a closed cylindrical vessel defining a detection volume or chamber 10. A second or central electrode 13, shown as an elongated member or wire, coaxially extends into detection chamber 10 from an electrical receptacle 12 located in an end wall of peripheral electrode 11.

A conduit or guard electrode 15, divided into two sections, is coaxially positioned within the detection chamber 10 around central electrode 13. The bottom section 15a extends from electrical receptacle 12 through the end wall of peripheral electrode 11 into the central portion of detection chamber 10. The upper section 15b extends from another electrical receptacle 30 through the top end wall of peripheral electrode 11 into detection chamber 10 to a location coaxially aligned with but spaced from bottom section 15a of the guard electrode. Central electrode 13 is coaxially held at its end portions within guard electrode 15 by electrical insulating material 17. The central portion of electrode 13 is left exposed to provide a length of counting wire 14. Suitable electrical insulation 16 is also provided around guard electrode sections 15a and 15b where they penetrate through the ends of peripheral electrode 11.

An opening or port 19 is provided at the bottom end of peripheral electrode 11 for admitting a nonradioactive counting gas. Pressure regulating valve 20 maintains the gas flow through port 19 at a sufficiently low rate to allow laminar flow in detection chamber 10. A bed of glass beads or other packing material 21 is disposed in the bottom portion of counting chamber 10 over port 19 to reduce turbulence and establish laminar flow of the counting gas. A grid 18 prevents the packing material from falling into port 19.

A sample injection tube 23 penetrates the bottom end of peripheral electrode 11 and extends longitudinally into chamber 10 parallel to but spaced from central electrode 13, guard electrode 15, and the sidewalls of peripheral electrode 11. Sample tube 23 is terminated below lateral alignment with counting wire 14. A receiving tube 25 of larger diameter than sample tube 23 penetrates the top end of peripheral electrode 11 in coaxially alignment opposite tube 23. Receiving tube 25 extends into detection chamber 10 to a location above lateral alignment with counting wire 14. A bypass tube 27 of smaller diameter than tube 25 branches from tube 25 outside of chamber 10 and penetrates the top end of peripheral electrode 11 but does not significantly extend into the detection chamber 10. Tubes 23, 25 and 27 are electrically separated from electrode 11 at their points of penetration by electrical insulation 28.

Pressure or flow regulating valve 22 is installed in tube 23 outside detection chamber 10 for admitting sample gas at laminar flow velocity. A solenoid or other motorized valve 24 capable of pulsating open and closed can also be installed in tube 23 downstream of valve 22 for sequentially introducing discrete quantities of sample gas.

A source of electrical potential difference 29 is shown having a plurality of taps 31 maintained at different electrical potential levels for connecting to electrodes 11, 13, 15a, 15b and tubes 23 and 25. Counting circuitry 33 is shown in electrical series with the central electrode 13 and the potential difference source 29. Circuitry 33 and source 29 may be any suitable electrical components of these types well known in the art.

Peripheral electrode 11 is maintained at ground potential by an electrical connection from source 29 to either or both electrical receptacles 12 and 30. Central electrode 13 and counting wire 14 are maintained at the greatest electrical potential in relation to ground by an electrical connection to receptacle 12 from source 29. Guard electrode 15 and tubes 23 and 25 are maintained at intermediate electrical potentials between the electrical potentials of electrodes 11 and 13 by suitable electrical connections shown in the drawing.

In order to minimize distortion in the electric field between electrodes 11 and 13 these intermediate potentials for the detector shown in the Figure are determined by the following equation:

$$V = Vc(\log B/R)/(\log B/A)$$

where: $V$ is the intermediate potential $Vc$ is the potential of the central electrode 13

$B$ is the radius to the inside wall of the peripheral electrode 11

$A$ is the radius of the central electrode at counting wire 14

$R$ is the radius to the center of the tubes 23 and 25 or the wall of guard electrode 15.

An active detector chamber volume 10a is sharply defined by maintaining guard electrode section 15a and 15b at the electrical potential given by the above equation. Volume 10a laterally extends from counting wire 14 to the peripheral electrode 11 surface and is abruptly terminated on a plane laterally aligned with the ends of guard electrode sections 15a and 15b. The remainder of detector chamber 10 is dead volume designated 10b above and below active volume 10a. Radiation particles passing only through dead volume 10b will not register on the counting circuitry 33.

Tubes 23 and 25 are maintained at the intermediate potential given by the equation to avoid disruption of the electrical field between electrodes 11 and 13. Since the tubes are at the same potential throughout their thickness or lateral dimensions there will be a small unavoidable disruption, and accordingly it is preferably that the tubes be terminated outside the active chamber volume 10a.

Although the preferred embodiment of the present invention is shown and described as a hollow cylindrical electrode with a central elongated electrode, other configurations can also be employed. For instance the first and second electrodes may take the form of parallel plates with the detection chamber volume defined in between the electrodes. It is desirable that the first and second electrodes be equally spaced in all lateral directions to maintain a uniform electrical field throughout the detection chamber. The preferred configuration shown in the drawing could be used as a proportional counter for determining beta spectra while the parallel plate embodiment may be employed as an ion chamber, for instance, in alpha spectroscopy.

In operating the laminar gas flow radiation detector of the present invention, a nonradioactive counting gas such as hydrogen or an argon-methane mixture is introduced into port 19. The counting gas used should be an electropositive or inert gas in proportional counter operation to minimize the capture of beta particles and permit amplification. The flow rate of the counting gas is regulated by valve 20 to allow streamline or laminar flow within the detection chamber 10. Laminar flow is promptly established as the counting gas passed through the bed of packing material 21. Tubes 23 and 25 are aligned parallel to the electrodes and direction of the counting gas flow to minimize disruption of the flow pattern. The counting gas is continuously withdrawn from the detection chamber 10 through receiving tube 25.

A sample gas, possibly containing radioactive material, is injected at a laminar flow velocity into the detection chamber 10 through tube 23. The sample gas is entrained as an integral core or a series of discrete integral pulses of sample gas within the laminar flow of counting gas rising from the bed of packing material 21. Solenoid valve 24 can be pulsated open and closed to sequentially introduce discrete quantities of sample gas while pressure regulating valve 22 maintains the sample gas in laminar flow. The sample gas passes through the active volume 10a around the counting wire 14 and ionization is produced within the counting gas from disintegration of radioactive sample material.

The ionization permits electrical conduction between electrodes 11 and 13 to create an electrical pulse which is transmitted to counting circuitry 33. Circuitry 33 can be synchronized in slight delay to valve 24 for counting only while the sample is within active volume 10a. The voltage between electrodes 11 and 13 is adjusted to operate the detector either as a proportional counter with amplification or as a nonamplifying ion chamber.

The sample gas and counting gas passes into receiving tube 25 and is removed from the counting chamber 10. A small flow of counting gas is continuously bled through bypass 27 into receiving tube 25 to prevent formation of a stagnant region in the upper portion of the detection chamber 10.

The radiation detector of the present invention can operate without a build up of residual radioactive material within the active volume of the detection chamber. This improved radiation detector will give excellent resolution for low energy beta and alpha decay spectroscopy. It can be used for instance to obtain a beta decay spectrum for tritium down to a few ev. and for good resolution at maximum decay energy (about 18.4 Kev.) that may provide data for evaluating the antineutrino mass.

What is claimed is:

1. In a gas-filled radiation detector including a first electrode member, a second electrode member parallel to said first electrode member, an enclosed detection chamber between said first and said second electrode members, and a source of electrical potential difference for maintaining said first and second electrodes at opposite electrical polarity, the improvement comprising:
   conduit means for passing a counting gas in laminar flow through said detection chamber;
   b. injection means disposed within said detection chamber in spaced relationship to said first electrode member and said second electrode member for entraining a sample gas in laminar parallel flow within the flow of said counting gas;
   c. discharge means coaxially aligned with said injection means for removing said gases from said detection chamber, said injection means, conduit means and discharge means being disposed to prevent contact of the sample gas with said first and said second electrodes; and
   d. a guard electrode having two aligned sections enclosing the end portions of said second electrode but leaving the central portion thereof exposed to define an active detector chamber volume laterally extending from said exposed portion to said first electrode, and means associated with said source of electrical potential difference for maintaining said guard electrode at an electrical potential intermediate the electrical potentials of said first and second electrodes.

2. In the gas-filled radiation detector of claim 1 wherein said first electrode is of elongated cylindrical shape defining said detection chamber therein and said second electrode being an elongated member disposed along the longitudinal axis of said first electrode and detection chamber.

3. In the gas-filled radiation detector of claim 1 wherein the lower portion of said detection chamber contains packing material to establish laminar flow in said counting gas.

4. In the gas-filled radiation detector of claim 1 wherein there is included in combination with said injection means, pulsating valve means for sequentially introducing discrete quantities of sample gas in laminar flow and counting means in circuit with said electrodes for counting electrical pulses only while said discrete quantities of sample gas are within said active detector chamber volume.

5. In the gas-filled radiation detector of claim 1 wherein said injection means and discharge means comprise a sample tube and a coaxially aligned receiving tube respectively, said sample and receiving tubes oppositely extending into said detection chamber to locations spaced from said active detector chamber volume and being parallel to said second and guard electrodes.

6. In the gas-filled radiation detector of claim 5 wherein said source of electrical potential difference includes means for maintaining said injection and receiving tubes at an electrical potential intermediate the electrical potentials of said first and second electrodes.

* * * * *